(12) United States Patent
Kato et al.

(10) Patent No.: US 8,060,166 B2
(45) Date of Patent: Nov. 15, 2011

(54) SLIDE MECHANISM OF PORTABLE EQUIPMENT AND PORTABLE EQUIPMENT

(75) Inventors: Hideo Kato, Kanagawa (JP); Taichi Nishihara, Kanagawa (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 527 days.

(21) Appl. No.: 12/349,103

(22) Filed: Jan. 6, 2009

(65) Prior Publication Data

US 2009/0181734 A1 Jul. 16, 2009

(30) Foreign Application Priority Data

Jan. 11, 2008 (JP) ................................ 2008-005056

(51) Int. Cl.
*H04M 1/00* (2006.01)
(52) U.S. Cl. .................. 455/575.4; 455/550; 455/575.1; 455/575.8; 455/90.3; 455/66.1
(58) Field of Classification Search ............... 455/575.4, 455/550, 90.3, 575.1, 575.8, 66.1
See application file for complete search history.

(56) References Cited

U.S. PATENT DOCUMENTS 7,319,893 B2 * 1/2008 Kato et al. ................. 455/575.4

2002/0132633 A1 * 9/2002 Johnson et al. ............... 455/550
2006/0176654 A1 * 8/2006 Kfoury .......................... 361/681

FOREIGN PATENT DOCUMENTS

EP 0978979 A2 * 2/2000
JP 2007-267238 10/2007

* cited by examiner

*Primary Examiner* — David Q Nguyen
(74) *Attorney, Agent, or Firm* — Notaro, Michalos & Zaccaria P.C.

(57) ABSTRACT the slide device and the portable equipment are equipped with a base member mounted on either one of a first casing and a second casing being components of a portable equipment, a slider member slidably mounted on either other one of the first casing and the second casing, and urging means provided between the slider member and the base member for slidably urging the base member and the slider member in a closing and/or an opening direction, and a slide engagement portion includes a plurality of guide rail portions provided on the slider member, a guide long hole provided outside a plurality of the guide rail portions on the slider member and extending in a slide direction, engagement portions provided on the base member and respectively engaged with each of the guide rail portions, and a slide guide portion engaged with the guide long hole.

8 Claims, 14 Drawing Sheets

Fig. 1
(a)
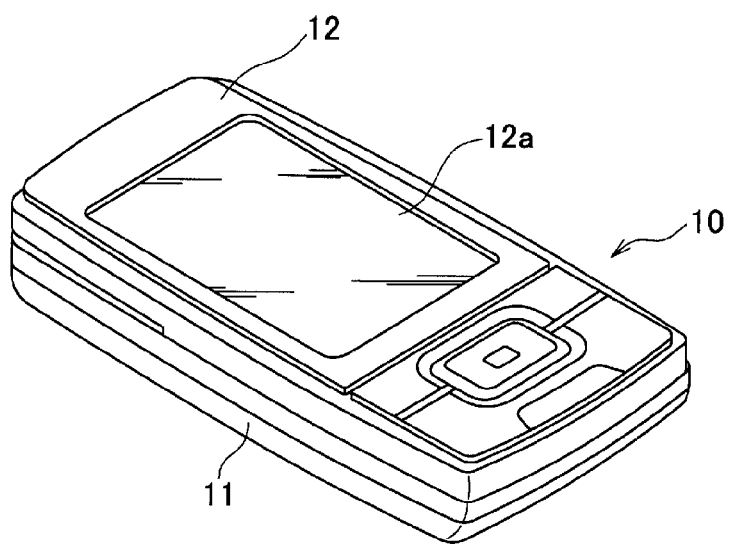
(b)
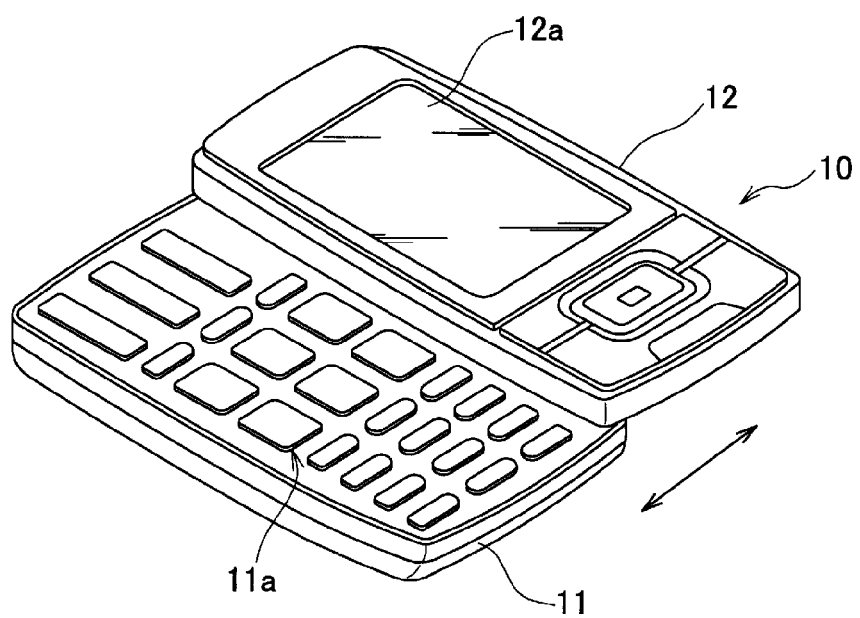

Fig. 3
(a)
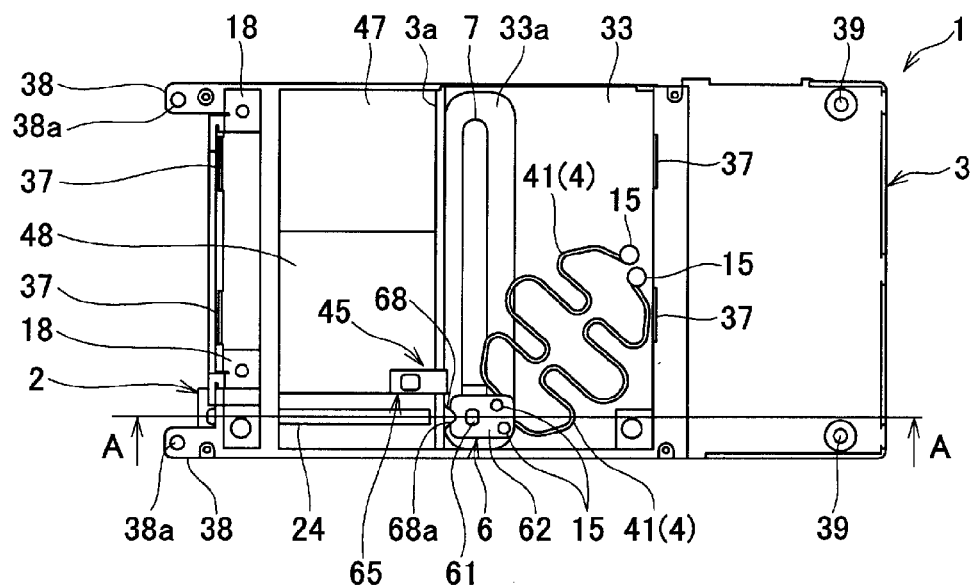
(b)
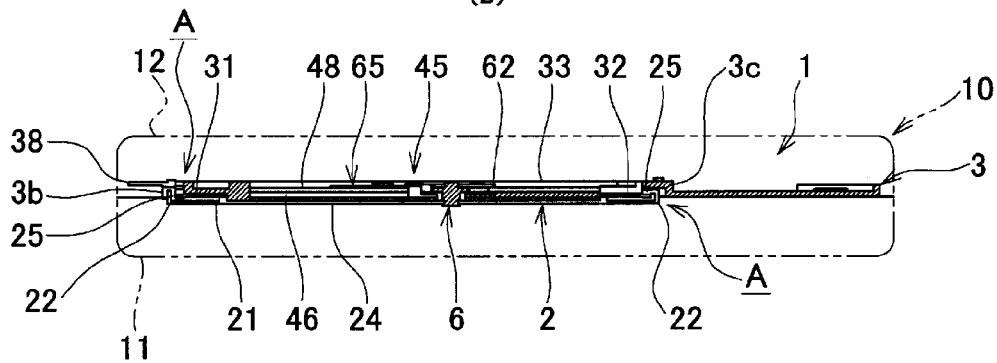
(c)
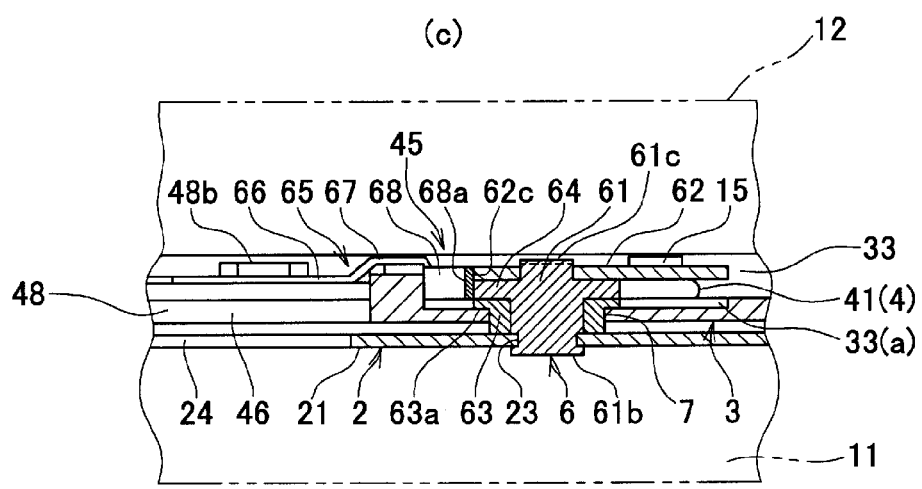

Fig. 12
(a)
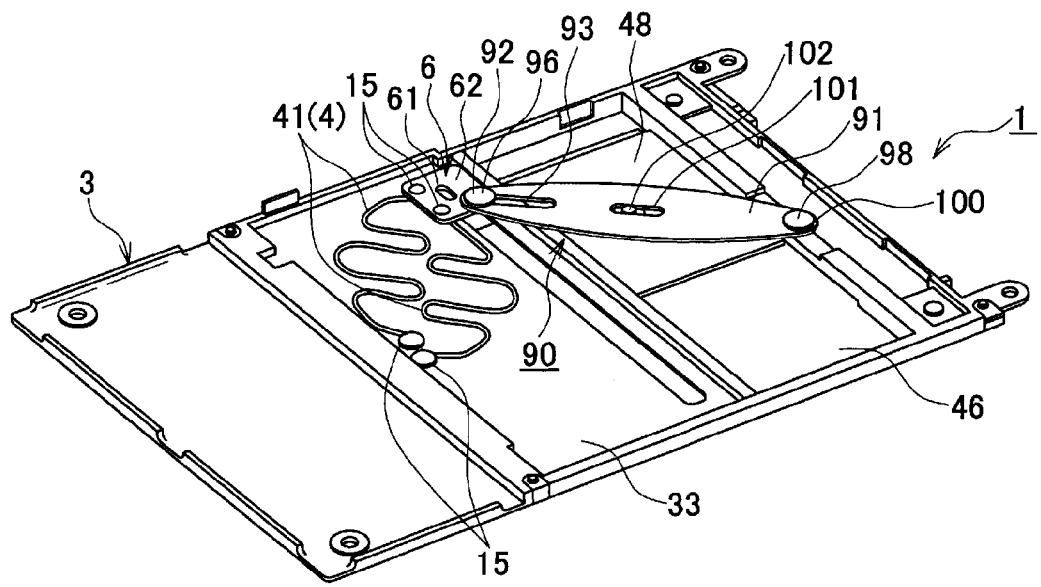
(b)
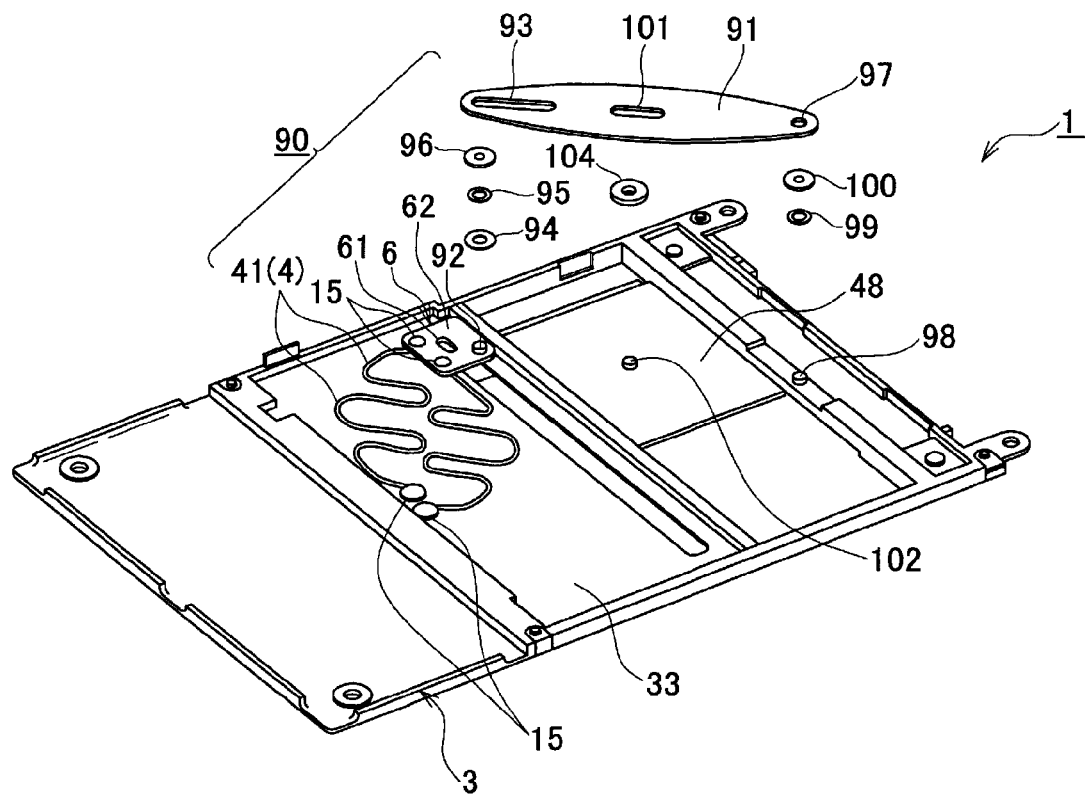

SLIDE MECHANISM OF PORTABLE EQUIPMENT AND PORTABLE EQUIPMENT

FIELD OF THE INVENTION

The present invention relates to a slide mechanism of a portable mechanism which is suitable for use in opening/closing a first casing and a second casing being components of a portable equipment by relatively sliding both casings in a linear direction from a state in which these casings overlap each other, and a portable mechanism equipped with the same.

BACKGROUND ART

In a portable telephone, a PDA, a pocket PC and the like which are portable equipments, an equipment comprising a first casing provided with a keyboard and the like on the upper surface, a second casing provided with a display and the like on the upper surface, and further a slide mechanism is already marketed, wherein the slide mechanism realizes a closed state, in which the first casing and the second casing overlap each other so as to cover the upper surface of the first casing with the second casing, and the slide mechanism realizes by sliding the second casing with regard to the first an opened state, in which the upper surface of the first casing is exposed. As such a portable equipment, the one disclosed in JP Laid-open patent application No. 2007-267238 is already known. The portable equipment described in this Laid-open patent application is, although not shown in the drawings in details, equipped with a slide mechanism which realizes, by relatively sliding in a short side direction the first and second casings, both having substantially a rectangular shape in a plan view, the closed state in which the first casing and the second casing overlap each other so that the upper surface of the first casing is covered with the second casing, and further realizes, by sliding second casing with regard to the first casing, the opened state, in which the upper surface of the first casing is exposed.

A slide mechanism disclosed in this Laid-open patent application is so designed that a first casing and a second casing are slidable with regard to each other by slidably engaging a slider member attached to the second casing with engagement portions provided on both sides of a base member attached to the first casing. Since a load is thus applied to the engagement portions on the both sides of the base member as engaged with the slider member, in sliding the second casing so that the upper surface of the first casing is exposed, an engagement length should be long between the base member and the slider member so as to assure a resistance for supporting the load. If an engagement length is designed to be long in this manner between the base member and the slider member, a dead area in which the casings partially overlap each other extends in a large area, so that a space on the upper surface of the first casing in particular can not be effectively used. In case of such an extended dead area, there is a problem of a reduced key space, and a further problem in that, in order to avoid this, a size of a portable equipment, and in a short side direction in particular must be extended.

Moreover, in case that a portable equipment having a large dead area is provided with springs being urging members between a base member and a slider member so as to realize a slide movement of the slider member with regard to the base member, a space for mounting a spring is inevitably narrow, so that springs are exposed to the outside, and to avoid this, there is a problem in that arrangement and settings of springs are restricted.

SUMMARY OF THE INVENTION

It is an object of the invention to provide a slide mechanism of a portable equipment which enables to maintain a sufficient engagement strength of a first casing and a second casing, even with a small overlapping size of the first and the second casings overlapping each other in exposing an upper surface of the first casing by sliding the second casing on an upper surface of the first casing, and a portable equipment having the same.

It is further an object of the invention to provide a slide mechanism of a portable equipment which can prevent urging means from being exposed to the outside, and a portable equipment having the same.

To achieve the above-mentioned object, a slide mechanism according to the present invention is equipped with a base member mounted to either one of a first casing and a second casing being components of a portable equipment, a slider member slidably engaged via a slide engagement portion with the base member and mounted to either other one of a first casing and a second casing, urging means provided between the slider member and the base member for slidably urging the base member and the slider member from a predetermined slide position respectively in a closing and an opening direction, characterized in that the slide engagement portion includes a plurality of guide rail portions provided on the slider member, a guide long hole provided outside a plurality of the guide rail portions on the slider member and extending in a slide direction, engagement portions provided on the base member and respectively engaged with each of the guide rail portions, and a slide guide portion engaged with the guide long hole.

According to the invention, a plurality of guide rail portions as well as a guide long hole extending in a slide direction are provided on a slider member, and on the other hand, a slide guide portion inserted into and thus engaged with the guide long holes is provided on a base member, so that a slidable engagement of the base member and the slider member is achieved by an engagement of engagement portions provided on both sides of the base member and a plurality of the guide rail portions provided on the slider member, as well as that of slide guide portions provided on the base member and a guide long hole provided on the slider member. Therefore, a sufficient engagement strength of a first casing and a second casing can be maintained even with a small overlapping size of the first casing and the second casing overlapping each other in exposing an upper surface of the first casing by sliding the second casing on an upper surface of the first casing.

In a slide mechanism according to the present invention, it is preferable that urging means are placed inside a bottomed spring receiving concave portion provided on a mounting surface on a surface toward the other casing on a slider member, with one end portion of the urging means being mounted on the slider member, and the other end portion on a portion of a slide guide portion extending beyond a guide long hole. Further according to the present invention, the slide guide portion is equipped with an escape preventing means for preventing from an escape from the guide long hole.

Furthermore, in a slide mechanism according to the present invention, it is preferable that urging means are flat-shaped springs bent on an identical plane, that on a base member a wire inserting long hole is provided for inserting a wire which connects a first casing mounted on the base member and a second casing mounted on a slider member, and that on the slider member, a wire guide hole is provided for guiding the wire inserted through the wire inserting long hole, as well as a cover for opening and closing the wire guide hole in sliding the base member with regard to the slider members is slidably mounted via a cover opening/closing mechanism.

Still further, in a slide mechanism according to the present invention, it is preferable that a cover opening/closing mechanism has a linking member connecting a cover and a slide guide portion and is so designed that the cover slides accompanied by a movement of slider members with regard to a base member, as well as that slide engagement portion is provided with roller portions on both end portions along a slide direction of engagement portions of the base member, and the roller portions are engaged with guide rail portions formed with U-formed cross section.

Still further, a portable equipment according to the present invention is characterized in that it is equipped with the above-mentioned slide mechanism according to the present invention.

As described above, in accordance with a slide mechanism and a portable equipment according to the present invention, a plurality of guide rail portions as well as a guide long hole extending in a slide direction are provided on a slider member, and further engagement portions engaged with the guide rail portions on both side portions of a base member, in addition to a slide guide portion inserted into and thus engaged with the guide long hole on the base member. Therefore, a slide engagement of the base member and the slider member is realized by an engagement of the engagement portions on the both side portions of the base member with a plurality of the guide rail portions on the slider members on one hand, and that of the slide guide portion on the base member with the guide long hole on the slider member on the other, so that a sufficient engagement strength of a first casing and a second casing is maintained, even with a small overlapping size of the first and the second casings overlapping each other in exposing an upper surface of the first casing by sliding the second casing on an upper surface of the first casing.

Moreover, according to this invention, a cover is connected via a linking member with a slide guide portion and is so designed that the cover slides along with a movement of a slider member with regard to a base member. Therefore, an opening/closing operation of the cover can be smoothly conducted due to a presence of the linking member.

Furthermore, slide engagement portion is provided with roller portions on both end portions along a slide direction of engagement portions of a base member, and the roller portions are so designed that they are engaged with guide rail portions formed with U-shaped cross section. Due to this design, a smooth slide operation can be achieved with causing no hindrances for a slide operation of a first casing with regard to a second casing, even if there occurs a twist in a slide movement of a slider member with regard to the base member, i.e. displacement in a travel distance of the slider member with regard to the base member in a forward/backward direction.

BRIEF DESCRIPTION OF THE DRAWINGS

FIGS. 1A and 1B show a portable phone as an example of a portable equipment according to the present invention, FIG. 1A being a perspective view showing its closed state, and FIG. 1B a perspective view showing its opened state.

FIGS. 3A to 3C are views showing an example of a slide mechanism of a portable equipment according to the present invention, FIG. 3A being its plan view, and FIG. 3B being a cross section along an A-A line, and FIG. 3C an enlarged cross section of its essential portion.

FIGS. 12A and 12B are views showing still another example of a cover opening/closing mechanism according to the present invention, FIG. 12A being a perspective view, and FIG. 12B being an exploded perspective view.

EMBODIMENTS OF THE INVENTION

Figure 2:
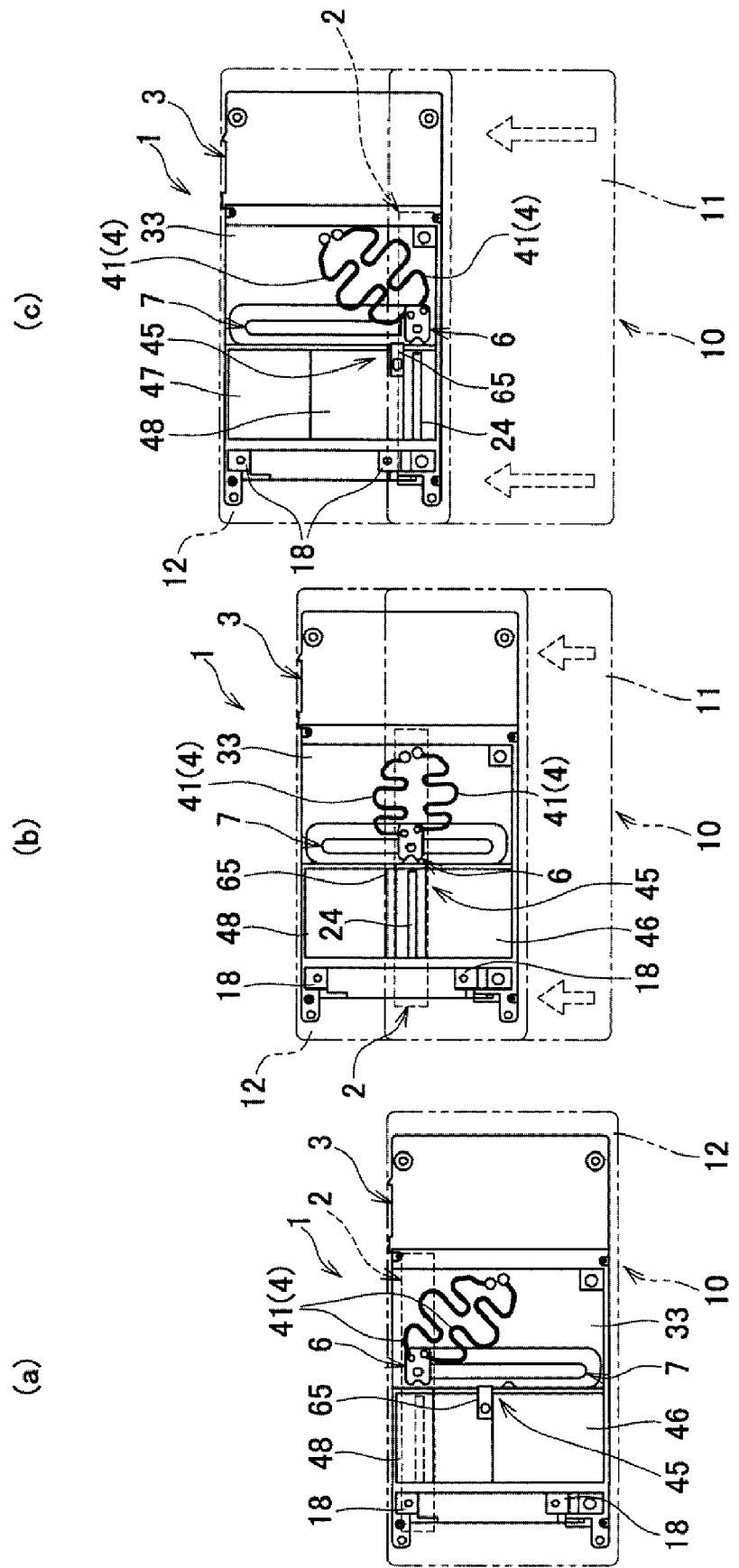
FIGS. 2A to 2C are explanatory views showing a movement of a slide mechanism according to the present invention, FIG. 2A being a view showing its closed state, and FIG. 2B showing its neutral state, and FIG. 2C showing its opened state.
Figure 4:
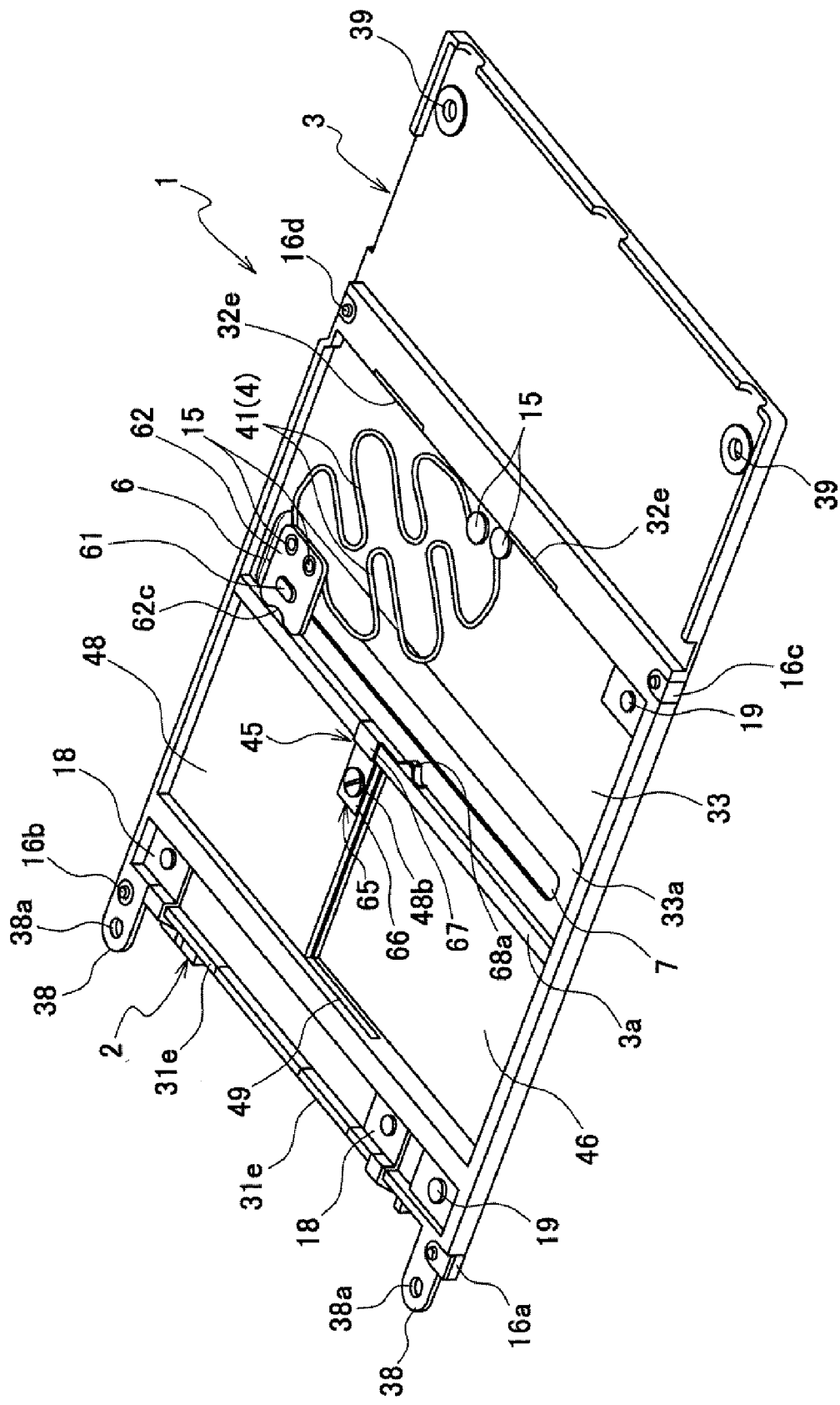
FIG. 4 is a perspective view showing an example of a slide mechanism of a portable equipment according to the present invention.
Figure 5:
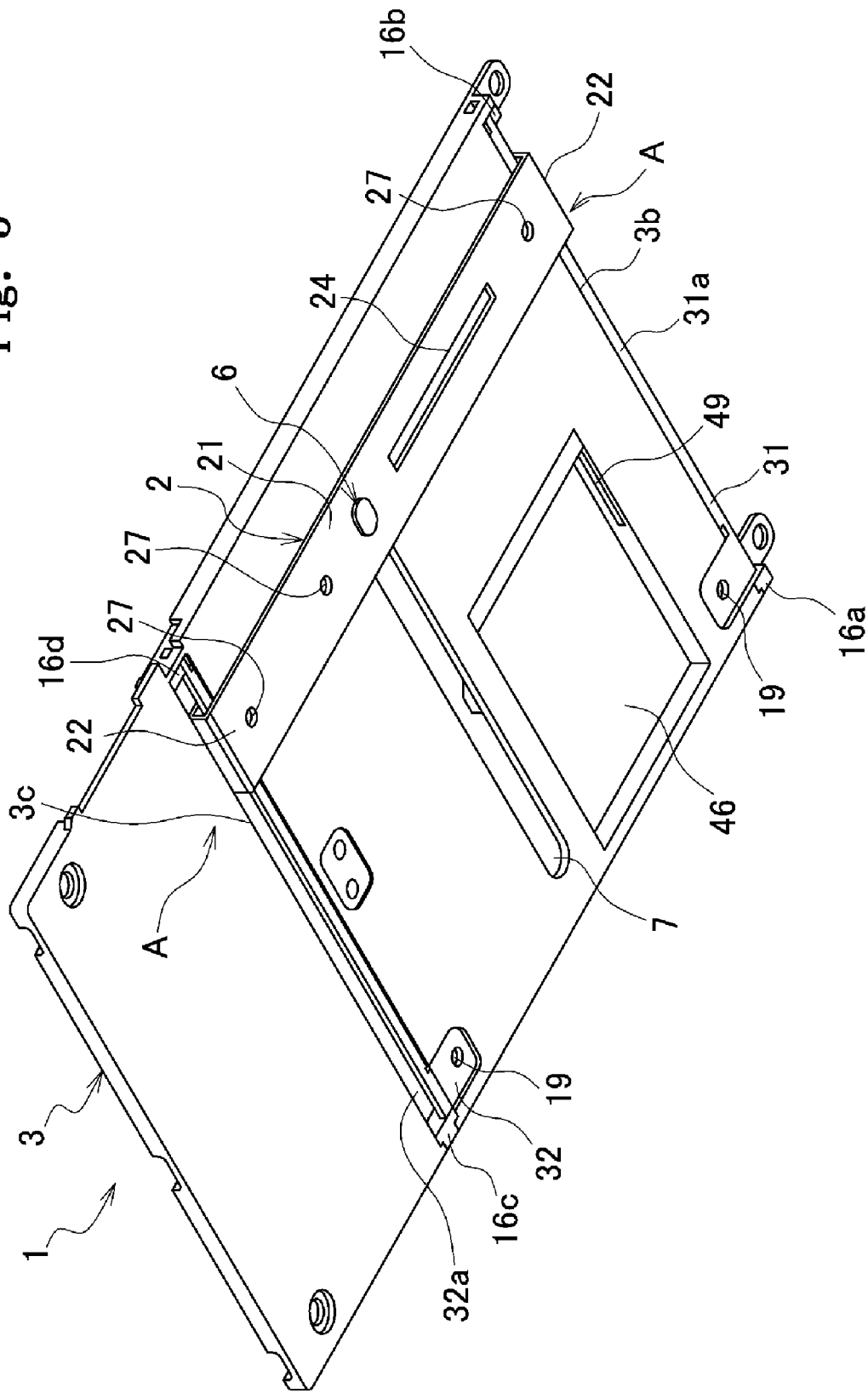
FIG. 5 is a perspective view of a slide mechanism of a portable equipment according to the present invention in a back side view.

In the following, an example of a slide mechanism of a portable equipment and a portable equipment having the same will be described in details, based on the accompanying drawings.

Embodiment 1

FIG. 1 shows an example of a portable equipment in an embodiment of the present invention. FIGS. 2 to 7 show an example of a slide mechanism according to the present invention. A slide mechanism according to the present invention comprises, as shown in FIGS. 1 to 7, a base member 2 mounted on a first casing 11 as a component of a portable equipment 10, a slider member 3 slidably engaged with the base member 2 and in this manner mounted on a second casing 12, urging means 4 elastically provided between the slider member 3 and the base member 2 for slidably urging the slider member 3 with regard to the base member 2 from a prescribed slide position in a closing or an opening direction, and the mechanism relatively slides the first casing 11 and the second casing 12 overlapping each other in a linear direction, so that it semi-automatically realizes a closed state and an opened state.

A slide mechanism 1 according to the present invention is partly characterized in that slide engagement portion A is formed by providing a plurality of guide rail portions 31a, 32a spaced apart and facing each other on a slider member 3, a guide long hole 7 extending in a slide direction between the guide rail portions 31a, 32a and engagement portions 22 engaged with the guide rail portions 31a, 32a on both side portions of the base member 2, as well as a slide guide portion 6 inserted into the guide long hole 7 and in this manner engaged with the base member 2, further having an escape preventing portion 64 for preventing an escape from the guide long hole 7.

A portable equipment 10 is not particularly limited, but includes e.g. a portable telephone, a PDA, a notebook PC, a portable terminal including Zaurus™ and the like, a calculator, a pocket computer, a portable game device and the like. In the meantime, a portable equipment in the present invention further includes ashtrays, case lid, and the like. In other words, every equipment sliding two casings with regard to each other is suitable. Accordingly, the portable equipment is not limited to that described in the following, although hereinafter reference will be made to an embodiment in a portable telephone as an example of a portable equipment.

A first casing 11 comprises e.g. a keyboard portion 11a on its upper surface. A second casing 12 comprises e.g. a display portion 12a including LCD and the like on its upper surface. The first casing 11 and the second casing 12 are respectively shaped substantially in a rectangular shape in a plan view. In the meantime, the first casing 11 and the second casing 12 are illustrated in an imaginary lines in FIG. 2. These casings, the first casing 11 and the second casing 12 overlap each other and are in this manner coupled to each other via a slide mechanism 1, so that they form a portable equipment 10. In other words, the portable equipment 10 is so designed that the upper surface of the first casing 11 and a lower surface the second casing 12 overlap each other so as to cover the keyboard portion 11a, while the keyboard portion 11a can be exposed by sliding and thus displacing the second casing 12 on the upper surface of the first casing 11.

A base member 2 is mounted via small screws and the like to one side portion in a short side direction on an upper surface of a first casing 11. The base member 2 comprises e.g. a base plate portion 21 shaped substantially in shape of a narrow rectangle in a plan view and flat shape, which extends in a longitudinal direction of the first casing 11, and engagement portions 22 having substantially a U-shaped cross section provided on both side end portions of the base plate portion 21. The engagement portions 22 may be formed by mounting separate elements, or formed integrally with the base plate portion 21 by bending both side portions of the base plate portion 21 which is thus shaped in a U-shaped cross section. The base member 2 is formed e.g. by pressing a stainless metal plate.

A base plate portion 21 is designed in a size smaller than a longitudinal width of a first casing 11. A guide portion mounting hole 23 having a shape substantially of a circle with side portions being cut off in parallel (substantially an elliptic shape) is provided substantially on a central portion in a longitudinal direction of the base plate portion 21. A wire inserting long hole 24 for inserting a wire, e.g. a wire 13 electrically connecting a first casing 11 and a second casing 12 is provided between one side portion and the guide portion mounting hole 23 of the base plate portion 21 in such a manner that the wire inserting long hole 24 extends in a longitudinal direction of the base plate portion 21. In addition, e.g. three through holes 27 for mounting a base member 2 via small screws and the like to the first casing 11 are provided on the base plate portion 21.

Figure 6:
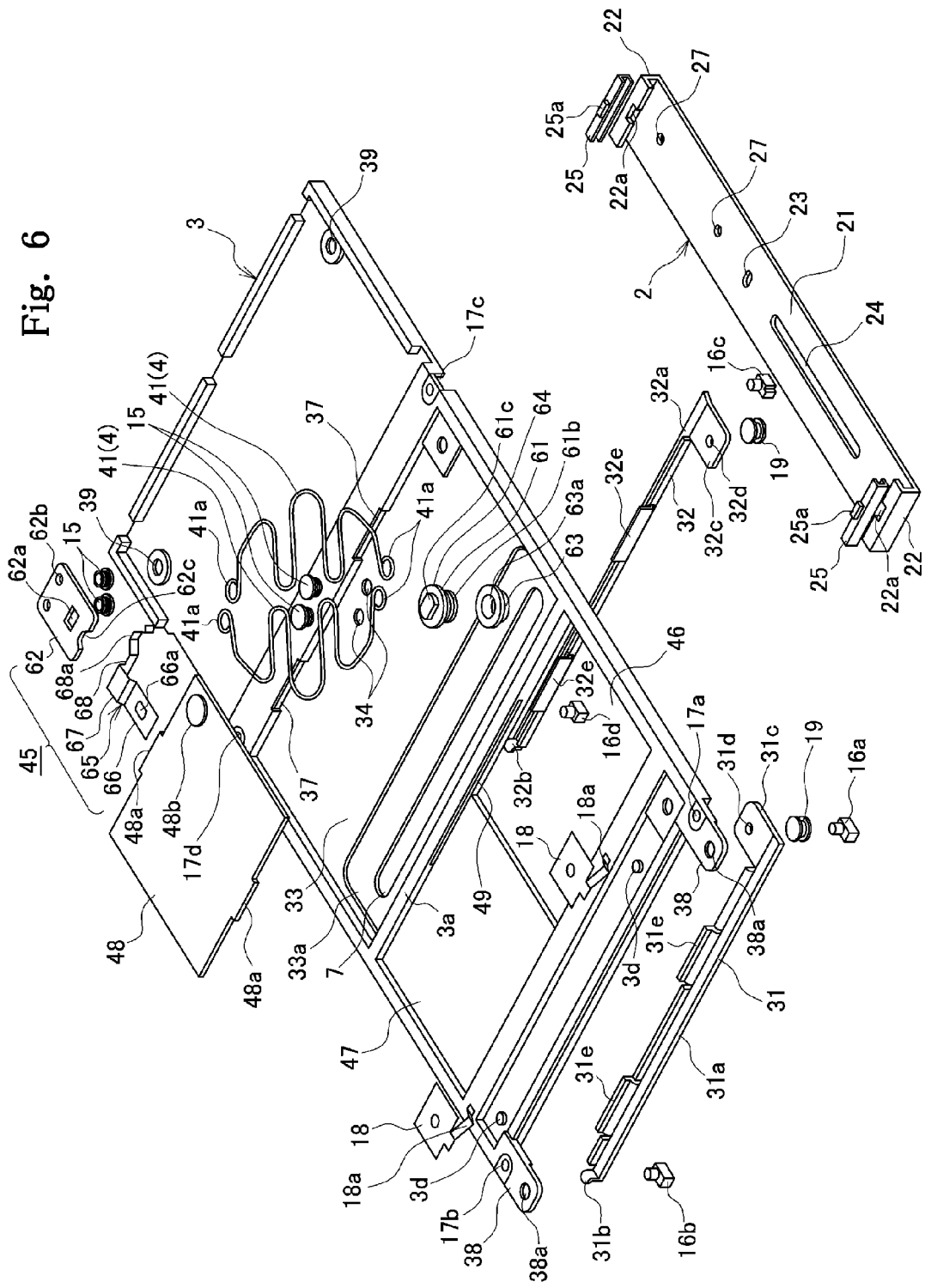
FIG. 6 is an exploded perspective view of a slide mechanism of a portable equipment according to the present invention.

Furthermore, slip facilitating members 25 having substantially a U-shaped cross section are preferably provided on engagement portions 22, in order that the slider member 3 can smoothly slide with regard to the facilitating member 25. The slip facilitating members 25 are not particularly limited, but e.g. made of resin with a small friction coefficient and the like. Engaging convex portions 25a engaged with engaging concave portions 22a of engagement portions 22 are provided, as shown in FIG. 6, on the slip facilitating members 25, so that a escape of the slip facilitating members 25 from the engagement portions 22 is prevented when the slider member 3 slides with regard to a base member 2.

A slider member 3 is mounted via small screws and the like on a lower surface of a second casing 12. The slider member 3 is shaped substantially in a shape of rectangle covering the lower surface of the second casing 12. Mounting pieces 38 having through holes 38a for mounting the mounting pieces 38 e.g. via small screws and the like are respectively provided on two corner portions on one end portion side of the slider member 3. Furthermore, through holes 39 for mounting the slider member 3 e.g. via small screws and the like are respectively provided in the vicinity of two corner portions on other end portion of the slider member 3.

Guide rail member mounting concave portions 3b, 3c are mounted in a short side direction respectively on one side end portion on an outer surface (a surface on a side opposite to a mounting surface mounted to a second casing 12) of a slider member 3, and at a point between other side end portion and a central portion, more specifically closer to a central portion. Guide rail members 31, 32 having a pair of guide rail portions 31a, 32a are mounted via mounting members 19 including e.g. pins and the like to the guide rail member mounting concave portions 3b, 3c. In the meantime, the guide rail portions 31a, 32a may be also formed integrally with the slider members 3. Further, the slider member 3 is fabricated by pressing a stainless metal plate. Still further, more than one pairs of guide rail portions 31a, 32a may be optionally provided.

Guide rail members 31, 32 in pairs are symmetrically designed. The guide rail members 31, 32 both extend in a short side direction of a slider member 3 and are thus mounted on the slider member 3. The guide rail members 31, 32 have guide rail portions 31a, 32a with which a base member 2 is slidably engaged. Engagement pieces 31b, 32b are provided on a front end portion, while mounting pieces 31c, 32c having through holes 31d, 32d for mounting via mounting members 19 including e.g. pins and the like are mounted on a rear end portion. Furthermore, two installing portions 31e, 32e fitted into installing holes 37 of the slider member 3 are provided on the guide rail members 31, 32.

Moreover, stopper mounting holes 17a, 17b, 17c, 17d for installing respectively four stoppers 16a, 16b, 16c, 16d are provided in the vicinity of points for installing a pair of guide rail members 31, 32 of a slider member 3. The stoppers 16a, 16b, 16c, 16d control a range of slide movement for a base member 2 and the slider member 3. This enables a first casing 11 and a second casing 12 to slidably shift between a closed state and an opened state, and an intermediate state between the closed state and the opened state is defined as a neutral state (see FIGS. 2B and 7B). In the meantime, the base member 2 is mounted to the first casing 11 and the slider member 3 to the second casing 12 in the present embodiment, but the base member 2 may be also mounted to the second casing 12, and the slider member 3 to the first casing 11. Further, control of the range of movement of the base member 2 and the slider member 3 may be also conducted via other means, and without using the stoppers. Still further, stoppers are preferably elastic members including rubbers or springs, since a cushioning effect then works.

An earth member 18 is mounted by press fitting or crimping to an earth member mounting member 3*d* in the vicinity of two corner portions on an inner surface in the vicinity of one side end portion of a slider member 3, and a contact portion 18*a* of the earth member 18 and a base member 2 are electrically connected with each other, so that a second casing 12 and a first casing 11 are connected to the earth.

A guide long hole 7 extending in a slide direction (short side direction) is provided substantially on a central portion of a pair of guide rail members 31, 32 of a slider member 3. The guide long hole 7 extends from the vicinity of a front end portion to the vicinity of a rear end portion on the slider member 3.

A bottomed spring receiving concave portion 33 is provided on an inner surface of a slider member 3. The spring receiving concave portion 33 is shaped in a concave shape having substantially a rectangular cross section, and thus extends from a substantially central portion including a portion of the guide long hole 7 between points for installing a pair of guide rail members 31, 32 to the vicinity of other end portion. An outer circumference of the guide long hole 7 of the spring receiving concave portion 33 is further recessed in a concave shape, so that this circumference is formed as a guide concave portion 33*a*. Moreover, two swing pin mounting holes 34 for installing swing pins 15 are provided substantially on a central portion in the vicinity of points for installing other guide rail member 32 of the spring receiving concave portion 33.

A cover opening/closing mechanism 45 is provided between one side portion and a spring receiving concave portion 33 of a slider member 3 at a position which substantially faces a wire inserting long hole 24 of a base member 2 during a slide movement of the slider member 3 with regard to the base member 2. A reference numeral 46 denotes a wire guide hole for guiding a wire 13, and a reference numeral 47 a cover receiving concave portion. Cover engagement concave portions 49 with which a slide cover 48 is slidably engaged are provided respectively on both side walls for forming the cover receiving concave portion 47 and the wire guide hole 46. The slide cover 48 prevents the interior of the wire guide hole 46 from an exposure to the outside, and are shaped substantially in a rectangular and flat shape. Engagement convex portions 48*a* slidably engaged with the cover engagement concave portions 49 are respectively provided on respective central portions of both side portions of the slide covers 48, so that the slide cover 48 open and close the wire guide hole 46, accompanied by a slide movement of the slider member 3. Moreover, a fitting convex portion 48*b* is provided on a surface of the slide cover 48 toward the spring receiving concave portion 33 and in the vicinity of a corner portion close to a rear portion of the slide cover 48. The wire guide hole 46, the cover receiving concave portion 47, the cover engagement concave portions 49 and the slide cover 48 as described above, and a cover actuating member 65 to be described below, and the above-mentioned slide guide plate 62 are components of the cover opening/closing mechanism 45.

A slide guide portion 6 has, in particular as shown in FIG. 3C, an escape preventing portion 64 inserted into and thus engaged with a guide long hole 7 as well as preventing an escape from the guide long hole 7. The slide guide portion 6 is e.g. equipped with a shaft 61 having the escape preventing portion 64 inserted into and thus engaged the guide long hole 7 as well as preventing an escape from the guide long hole 7, a slide guide plate 62 fixed on the top portion of the shaft 61, and a spacer 63 installed on an outer circumference of the shaft 61. The shaft 61 is formed with a diameter shorter than a width of the guide long hole 7 and a length longer than a depth of the guide long hole 7. A flange-shaped escape preventing portion 64 with a diameter longer than the width of the guide long hole 7 is provided on an end portion of the shaft 61 toward a second casing 12. A base member fixing portion 61*b* which is fitted and inserted into a guide portion mounting hole 23 with the tip being crimped so that the slide guide portion 6 is fixed on the base member 2 is provided on an end surface of the shaft 61 toward the base member 2. Moreover, a slide guide plate fixing portion 61*c* having a shape substantially of a circle with side portions being cut off in parallel (substantially an elliptic shape) which is fitted into a shaft mounting hole 62*a* of a slide guide plate 62 with the tip being crimped so that the slide guide plate fixing portion 61*c* is fixed on the slide guide plate 62 is provided on an end surface of the shaft 61 toward the second casing 12.

Furthermore, a spacer 63 of a diameter substantially identical to or smaller than a width of a guide long hole 7 having a flange 63*a* with a diameter substantially identical to an escape preventing portion 64 is installed on an outer circumference of a shaft 61. The spacer 63 is so designed that a length from a tip of the spacer 63 to the flange 63*a* is longer than a depth of the guide long hole 7. The shaft 61 is slidably engaged via this spacer 63 without protruding into the guide long hole 7. In other words, the spacer 63 installed on the outer circumference of the shaft 61 is slidably engaged with the guide long hole 7, and the flange 63*a* of the spacer 63 is as well contacted with a guide concave portion 33*a* in the vicinity of the guide long hole 7 (see FIG. 3C), so that a slide guide portion 6 is slidably engaged via this spacer 63 without protruding into the guide long hole 7.

A slide guide plate 62 is shaped in a substantially rectangular and flat shape. A shaft mounting hole 62*a* in a shape substantially of a circle with side portions being cut off in parallel (substantially an elliptic shape) is provided on the slide guide plate 62. Furthermore, two swing pin mounting holes 62*b* for mounting swing pins 15 are provided on the slide guide plate 62. The swing pin mounting holes 62*b* are so designed that these swing pin mounting holes 62*b* are located in a line along a width direction and including swing pin mounting holes 34 of a slider member 3 when a base member 2 and the slider member 3 are in a neutral state (a neutral state in an example according to the drawings). In the meantime, the swing pin mounting holes 62*b*, 34 are arranged on a line along a width direction of a first casing 11 or a second casing 12. However the arrangement is not limited thereto, but it is also possible that the swing pin mounting holes 62*b*, 34 are not located on a line along a width direction of a first casing 11 or a second casing 12.

A cover actuating member engagement concave portion 62*c* substantially in a trapezoidal shape with which a cover actuating member 65 for opening/closing a slide cover 48 is engaged is provided substantially on a central portion on an end portion of a slide guide plate 62 toward a cover opening/closing mechanism 45. The cover actuating member 65 is equipped with an installing portion 66 having a fitting hole 66*a* into which a fitting convex portion 48*b* is fitted and thus fixed, a slide portion 67 substantially in a U-shape engaged with a central frame 3*a* of a slider member 3 between a cover installing concave portion 47 and a spring installing concave portion 33, so as to be slidable in a forward/backward direction, and an engagement actuating portion 68 located between the central frame 3a and the slide guide plate 62 and further having an engagement actuating convex portion 68a engaged with the cover actuating member engagement concave portion 62c of the slide guide plate 62. The engagement actuating portion 68 is shaped in an elongated flat shape, and a portion toward the tip is bent substantially in a trapezoidal shape so as to be engaged with the cover actuating member engagement concave portion 62c, and in this manner the engagement actuating convex portion 68a is formed.

This makes it possible that a slide guide plate 62 is not engaged with a cover actuating member 65 in a closed state, and that the slide guide plate 62 touches an engagement actuating convex portion 68a of the cover actuating member 65 in mid-course when a slider member 3 slides with regard to a base member 2 from the closed state to an opened state, and pushes the cover actuating member 6 forward in a slide direction (in a direction of a rear portion). An engagement convex portion 48a of a slide cover 48 touches a rear side wall of a cover engagement concave portions 49 and a wire guide hole 46 is covered with a slide cover 48, and thereafter the slide guide plate 62 runs upon the engagement actuating convex portion 68a and the engagement actuating convex portion 68a is engaged with a cover actuating member engagement concave portion 62c, thus realizing the opened state. When the slider member 3 slides with regard to the base member 2 from the opened state to the closed state, the cover actuating member 65 accompanied by a slide guide portion 6 is shifted to an opening direction of a slide cover 48. Then in a neutral state, the engagement convex portion 48a of the slide cover 48 touches a front side wall of the cover engagement concave portions 49 and at the same time the wire guide hole 46 is opened, and in the same state a side wall of the slide guide plate 62 runs upon the engagement actuating convex portion 68a and the engagement actuating convex portion 68a is released from an engagement with the cover actuating member engagement concave portion 62c, thus realizing the closed state.

Urging means 4 slidably urge a slider member 3 with regard to a base member 2 from a predetermined opening/closing position, e.g. a neutral state in a closing direction or an opening direction. The urging means 4 are not particularly limited, but are preferably flat-shaped springs 41 and the like. Flat-shaped springs 41 are made by bending a wire regularly or irregularly with no portion overlapping the other, and have an urging force in a width direction of a first casing 11 or a second casing 12. Installing portions 41a rotatably installed on swing pins 15 are respectively provided on both end portions of the flat-shaped springs 41. The installing portions 41a are formed e.g. by bending a wire into a substantially circular shape.

A length of each flat-shaped spring 41 may be also designed in a size substantially identical to a length between swing pins 15 attached to a slide guide portion 6 fixed to a base member 2 and those attached to a slider member 3, but is preferably designed in a size exceeding, e.g. slightly exceeding the length between the swing pins. This makes it possible that flat-shaped springs 41 are deflected in a shape substantially of circular arc and the like against an urging force in a closed or opened state, and a closed or opened state is retained due to the urging force.

In the following, reference is made to an effect of the slide mechanism 1 and the portable equipment 10 according to the present invention.

When the portable equipment 10 is out of use, it is normally in a closed state, in which the first casing 11 and the second casing 12 overlap each other (see FIGS. 1A, 2A and 7A). In this state, the flat-shaped springs 41 are deflected against their urging force and push the second casing 12 toward the first casing 11, so that the first casing 11 and the second casing 12 are held in a closed state, in which they almost entirely overlap each other. In the meantime, a locking mechanism may be also provided in order to better ensure that the closed state is retained.

In using the keyboard portion 11a set on the first casing 11 of the portable equipment 10, the second casing 12 is e.g. slid using one hand in an opening direction in the short side direction while the first casing 11 is stabilized using other hand. The operation can be obviously conducted using a single hand. At this point, the length between respective both end portions of the two flat-shaped springs 41 is gradually decreased, that is, the flat-shaped springs 41 are contracted by pressure when the second casing 12 is slid with regard to the first casing 11.

Thereafter, as shown in FIGS. 2B and 7B, the state in which the length between respective both end portions of the flat-shaped springs 41 is the shortest is the neutral state (in the example according to the drawings it is the neutral state), and after passing the neutral state, the positions of the both end portions of the flat-shaped springs 41 switch each other in a forward/backward direction, and at the same time the slider member 3 is urged in an opening direction with regard to the base member 2 due to the urging force of the flat-shaped springs 41. This makes it possible that the first casing 11 and the second casing 12 automatically slide with regard to each other in an opening direction, so that the fully-opened state of the first casing 11 and the second casing 12 is realized, and the casings are held in this state (see FIGS. 1B, 2C and 7C). At this point, the keyboard portion 11a on an upper surface of the first casing 11 is exposed, so that the keyboard is available for operation. In the meantime, a locking mechanism may be also provided in order to better ensure that the closed state is retained. Accordingly, in sliding the second casing 12 with regard to the first casing 11 from the closed state in which the both casings overlap each other to the opened state, a semi-automatic slide operation from the neutral state is possible.

Next, in order to bring back to the closed state the second casing 12 fully-opened with regard to the first casing 11, the second casing 12 is slid using one hand in an closing direction in the short side direction while e.g. the first casing 11 is stabilized using other hand. The operation can be obviously conducted using only a single hand. At this point, the flat-shaped springs 41 are contracted, and after passing the neutral state, the positions of the both tips of the flat-shaped springs 41 are urged in such a direction that the tips are separated from each other, so that the second casing 12 automatically slides with regard to the first casing 11 in a closing direction, thus realizing a closed state (see FIGS. 1A, 2A and 7A). Accordingly, in sliding the second casing 12 with regard to the first casing 11 from the opened state to the closed state, a semi-automatic slide operation from the neutral state is possible. In the meantime, it is also possible that the semi-automatic slide operation is conducted exclusively in a single direction of the opening and the closing directions.

The semi-automatic slide operation of the second casing 12 with regard to the first casing 11 is conducted at 3 points, i.e. using the engagements of the engagement portions 22 on both side portions of the base member 2 and guide rail members 31, 32 of the slider member 3 as well as the engagement of the slide guide portion 6 substantially on the central portion of the base member 2 and the guide long hole 7 on the slider member 3, so that the engagement strength is increased and the overlapping width of the first casing 11 and the second casing 12 at the time of opening can be reduced. In other words, when the second casing 12 is fully opened with regard to the first casing 11, the load on the first casing 11 and the second casing 12 can maintain a sufficient engagement strength in comparison to the case of two merely engagements even with a smaller overlapping size of the first casing 11 and the second casing 12, due to engagement of the slide guide portion 6 and the guide long hole 7 in addition. As a result, the dead area in which the both casings overlap each other can be reduced, so that the downsizing of the portable equipment 10 can be achieved and the exposure range of the keyboard portion 11a can be enlarged. Moreover, due to the engagements of the base member 2 at 3 points, i.e. a pair of the guide rail members 31, 32 of the slider member 3 and the guide long hole 7, a warping strength of the slider member 3 itself is increased, so that strength of the entire slide mechanism 1 can be greatly increased.

Furthermore, the two flat-shaped springs 41 are installed inside the bottomed spring installing concave portion 33 and provided between the slider member 3 and the second casing 12, thus preventing the flat-shaped springs 41 from exposing to the outside, so that restrictions to arrangement and settings of the flat-shaped springs 41 are relaxed, and settings are facilitated also in case of other configurations of springs and urging means. Further, with a use of the flat-shaped springs 41, of which the thickness is identical to the diameter of the wire, the thickness of the springs 41 can be reduced, so that a design of a thinner overall profile can be realized. Still further, with the spring installing concave portion 33 being provided on the slider member 3, the spring installing concave portion 33 can movably accommodate the flat-shaped springs 41, enabling to seek for a further thinner overall profile.

Figure 7:
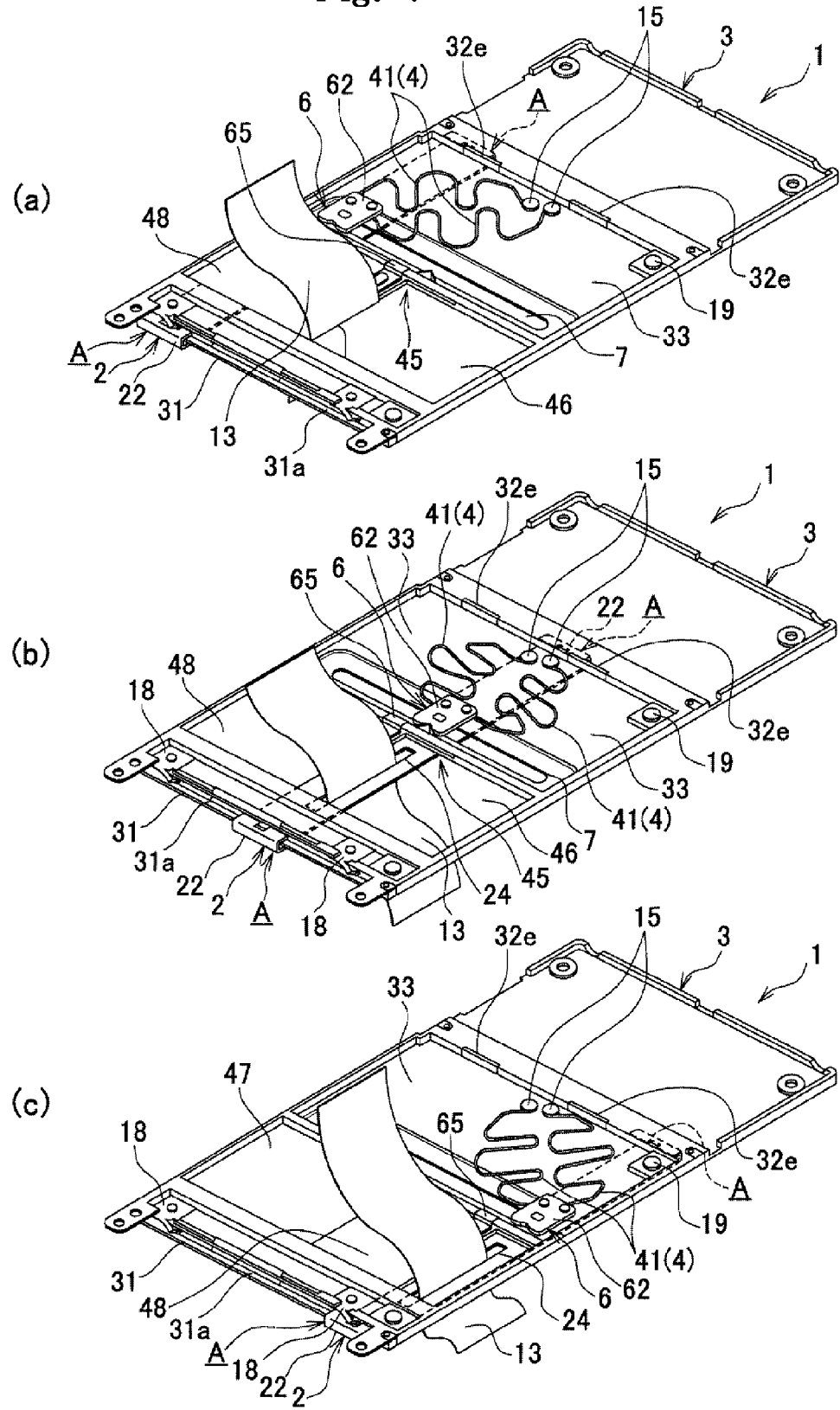
FIGS. 7A to 7C are perspective views illustrating a movement of a cover opening/closing mechanism according to the present invention, FIG. 7A being a view showing its closed state, and FIG. 7B showing its neutral state, and FIG. 7C showing its opened state.
Figure 8:
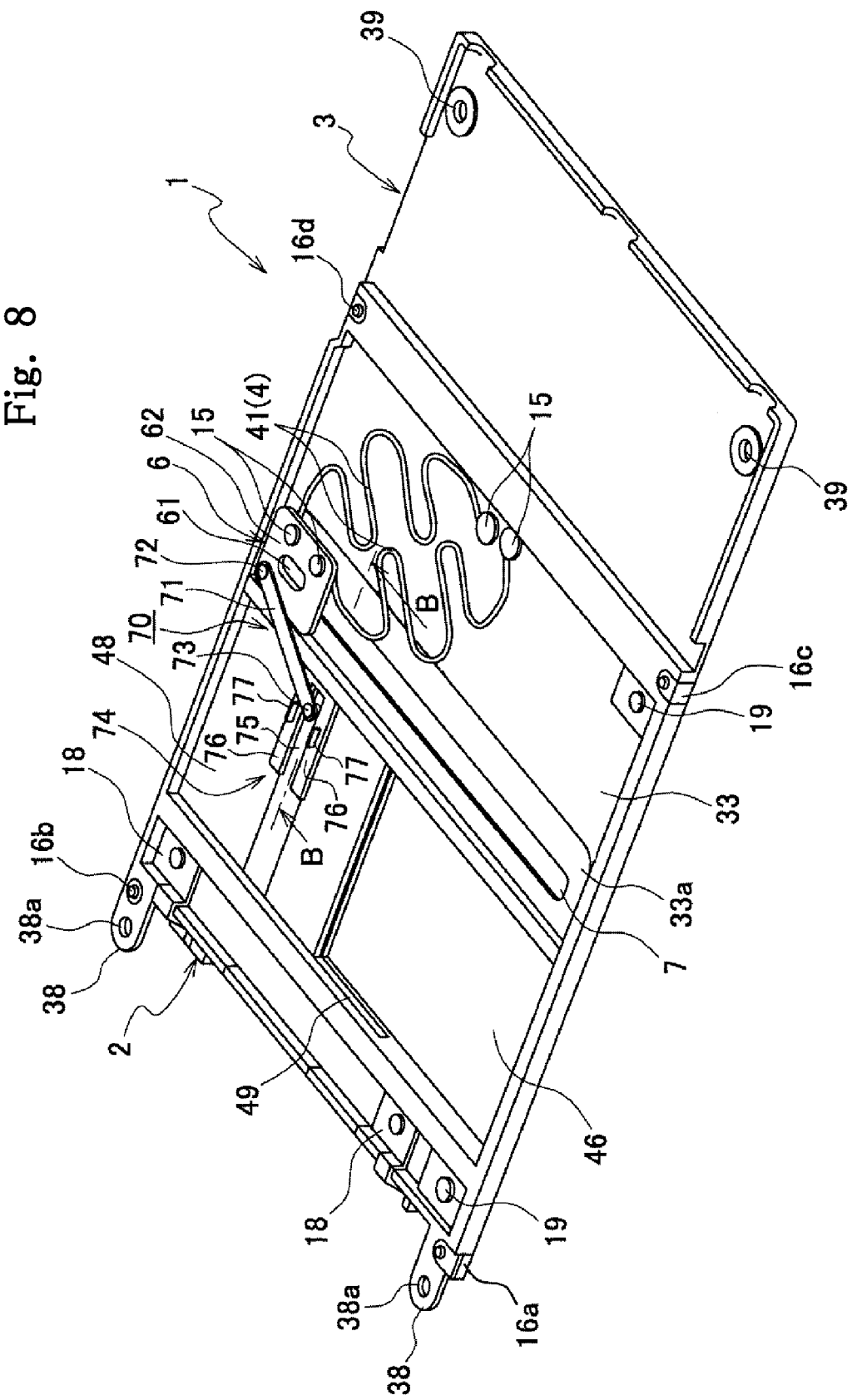
FIG. 8 is a perspective view showing another embodiment of a cover opening/closing mechanism according to the present invention.
Figure 9:
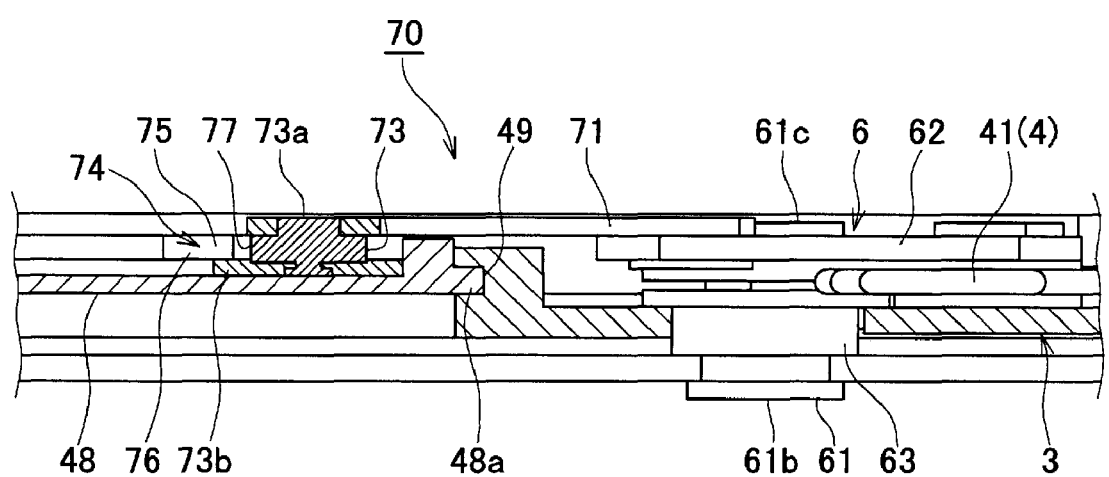
FIG. 9 is an enlarged cross section of FIG. 8 along a B-B line.
Figure 10:
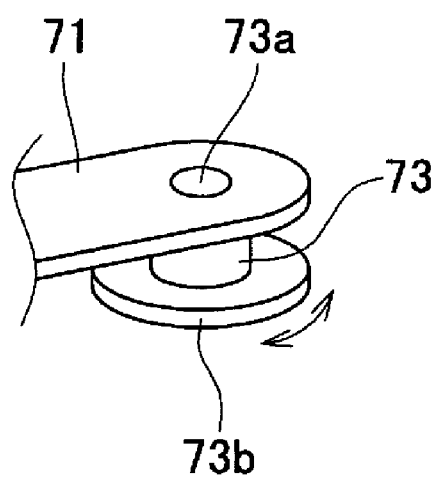
FIG. 10 is a perspective view of a tip portion of a linking member of FIG. 8.

In the following reference is made to the operation of the cover opening/closing mechanism 45. The wire 13 e.g. formed of FPC for electrically connecting the first casing 11 and the second casing 12 is, as shown in FIG. 7, inserted into the wire inserting long hole 24 and the wire guide hole 46, and when the second casing 12 slides with regard to the first casing 11 from the closed state to the opened state, the slide guide plate 62 of the slide guide portion 6 touches and further pushes the engagement actuating convex portion 68a of the cover actuating member 65, so that the slide cover 48 is shifted via the cover actuating member 65 in the slide direction. The engagement convex portion 48a of the slide cover 48 thus shifted touches the rear side wall of the cover engagement concave portions 49, so that the movement of the slide cover 48 stops, and at this point the wire guide hole 46 is covered with the slide cover 48. The slide cover 48 covers the wire guide hole 46 and stops, but when the first casing 11 slides with regard to the second casing 12 in the opening direction, the side wall of the slide guide plate 62 runs upon the engagement actuating convex portion 68a, so that the engagement actuating convex portion 68a is engaged with the cover actuating member engagement concave portion 62c, thus realizing the opened state. Therefore, in the opened state, the exposure of the wire 13 to the outside is prevented. Moreover, in the opened state, the slide cover 48 is held as is due to an engagement of the engagement actuating convex portion 68a with the cover actuating member engagement concave portion 62c, so that the exposure of the wire 13 to the outside is more effectively prevented. Still further, the engagement of the engagement actuating convex portion 68a with the cover actuating member engagement concave portion 62c enables to prevent rattling of the slide cover 48.

On the other hand, when the second casing 12 slides with regard to the first casing 11 from the opened state (see FIGS. 1B, 2C and 7C) to the closed state (see FIGS. 1A, 2A and 7A), the cover actuating member 65 accompanied by the slide guide portion 6 is shifted with regard to the slider member 3 into such a direction that the slide cover 48 is opened, and in this manner the engagement convex portion 48a of the slide cover 48 touches the front side wall of the cover engagement concave portions 49, thus realizing the state in which the wire guide hole 46 is opened (the neutral state) (see FIGS. 2B and 7B). At this point, the wire 13 accompanied by the movement of the slider member 3 is shifted substantially to the central portion of the slider member 3. In further sliding from this state, the slide guide plate 62 runs upon the engagement actuating convex portion 68a, so that the slide guide portion 6 is released from an engagement with the cover actuating member 65, thus realizing the closed state of the first casing 11 and the second casing 12. In this manner, operability is improved in the closed state, since the engagement actuating convex portion 68a is released from an engagement with the cover actuating member engagement concave portion 62c in the closed state. Furthermore, the wire 13 moves inside the wire guide hole 46 accompanied by a slide movement of the slider member 3, so that the length of the wire 13 can be reduced in addition to the possibility of simplifying a routing of the wire 13.

Embodiment 2

FIGS. 8 to 11 show other example of a cover opening/closing mechanism. As shown in the drawings, a cover opening/closing mechanism 70 according to the present embodiment is designed by linking a slide guide plate 62 of a slide guide portion 6 and a slide cover 48 via a linking member 71. A first rotation supporting member 72 is mounted on the slide guide plate 62, and on the first rotation supporting member 72 one end portion of the linking member 71 is rotatably mounted. The linking member 71 is shaped in an elongated flat bar-like shape, and its other end portion is rotatably supported on a second rotation supporting member 73. The second rotation supporting member 73 is shaped substantially in a columnar shape, with rotation supporting portion 73a for rotatably supporting the linking member 71 being provided on one end surface, as shown in particular in FIG. 9. A roller member 73b of a greater diameter is rotatably mounted on other end surface of the second rotation supporting member 73 (see FIGS. 9 and 10). The second rotation supporting member 73 is engaged with a linking member guide portion 74 of the slide cover 48.

A linking member guide portion 74 is formed by extending substantially on a central portion in a slide direction of a slide cover 48 and in a direction perpendicular to the slide direction (width direction). The linking member guide portion 74 comprises a linking member guide concave portion 75 extending in the width direction of the slide cover 48, and linking member guide plates 76 provided on both side portions from a cover side end portion to the substantially central portion of the slide cover 48, and facing each other. A distance between the linking member guide plates 76 is designed in a size larger than a diameter of a second rotation supporting member 73 and smaller than a roller member 73b of the second rotation supporting member 73, e.g. in a size slightly larger than the diameter of the second rotation supporting member 73. The roller member 73b of the second rotation supporting member 73 is inserted between the linking member guide plates 76 and the linking member guide concave portion 75, and in this manner the second rotation supporting member 73 is engaged with the linking member guide concave portion 75 so as to be movable in the width direction of the slide cover 48. Second rotation supporting member holding portions 77 are respectively provided in the vicinity of end portions on a cover side of the linking member guide plates 76, for holding the second rotation supporting member 73 at the cover side end portion (it may be called first end portion of the linking member guide concave portion 75. The second rotation supporting member holding portions 77 are shaped in a protruding shape with a size slightly smaller than the diameter of the second rotation supporting member 73.

Figure 11:
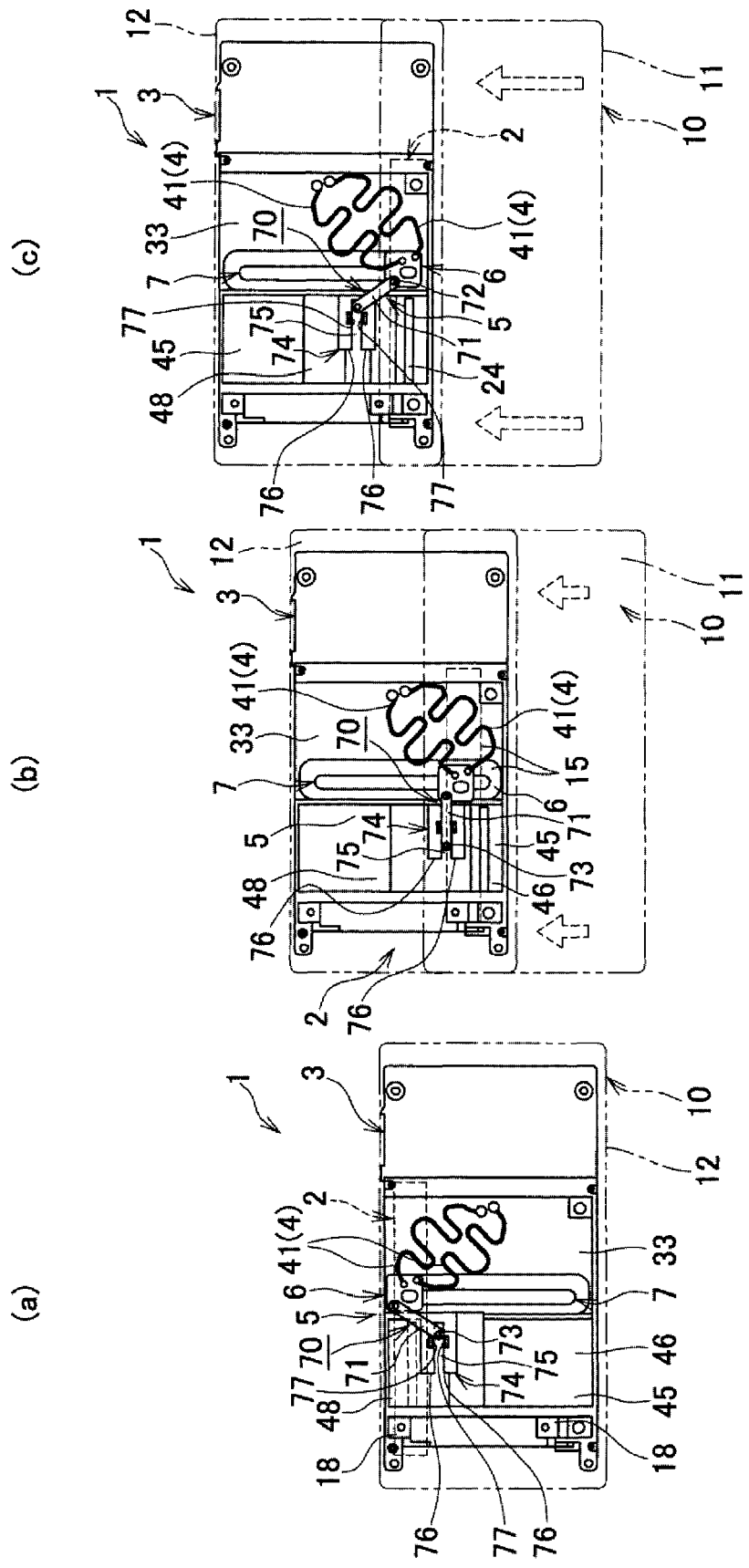
FIGS. 11A to 11C are explanatory views showing a movement of a cover opening/closing mechanism as shown in FIG. 8, FIG. 11A being a view showing its closed state, and FIG. 11B showing its neutral state, and FIG. 11C showing its opened state.

This makes it possible that in a state of a first casing 11 and a second casing 12 overlapping each other, and in particular in a closed state as shown in FIG. 11, a wire guide hole 46 is opened and a second rotation supporting member 73 is held on a first end portion of a linking member guide portion 74. Further in sliding the second casing 12 with regard to the first casing 11 from this state into an opened state, a slide cover 48 accompanied by a movement of a slide guide plate 62 (a slide guide portion 6) slides via a linking member 71 into such a direction that the wire guide hole 46 is covered. The slide cover 48 stops sliding when an engagement convex portion 48a of the slide cover 48 touches a rear side wall of a cover engagement concave portions 49, and the state is that in which the wire guide hole 46 is covered with the slide cover 48. When the second casing 12 further slides with regard to the first casing 11 into the opened state, the second rotation supporting member 73 is detached from second rotation supporting member holding portions 77 and slides inside the linking member guide portion 74 in such a direction that the second rotation supporting member 73 is spaced apart from the slide guide plate 62. Then, a configuration is so designed (see FIG. 11) that positions of both side portions of the linking member 71 switch each other from a state in which the linking member 71 is stretched in a width direction of the slide cover 48, and in the opened state of the first casing 11 and the second casing 12, the second rotation supporting member 73 is held by the second rotation supporting member holding portions 77 at the first end portion of the linking member guide portion 74.

Moreover, when a second casing 12 slides with regard to a first casing 11 from an opened state to a closed state, a slide cover 48 accompanied by a movement of a slide guide plate 62 (a slide guide portion 6) slides via a linking member 71 into such a direction that a wire guide hole 46 is opened, since a second rotation supporting member 73 is held by second rotation supporting member holding members 77 at a first end portion of a linking member guide portion 74. The slide cover 48 with an engagement convex portion 48a touching a front side wall of cover engagement concave portions 49 stops sliding, so that the wire guide hole 46 is opened. Further the first casing 11 and the second casing 12 slide with regard to each other into a closed state, the second rotation supporting member 73 is detached from second rotation supporting member holding portions 77 and slides inside the linking member guide portion 74 in such a direction that the second rotation supporting member 73 is spaced apart from the slide guide plate 62. Then, a configuration is so designed that positions of both side portions of the linking member 71 switch each other from a state in which the linking member 71 is stretched in a width direction of the slide cover 48, and in the closed state of the first casing 11 and the second casing 12, the second rotation supporting member 73 is held by the second rotation supporting member holding portions 77 at the first end portion of the linking member guide portion 74.

In applying in this manner, the principle of leverage by a linking member 71 works, so that a slide operation of a slide cover 48 is made smooth, and in further providing a roller member 73b engaged with a linking member guide portion 74 on a second rotation supporting member 73 located on the side of the slide cover 48 of the linking member 71, the slide operation of the slide cover 48 is made further smoother.

Embodiment 3

FIG. 12 shows still other example of a cover opening/closing mechanism. As shown in FIG. 12, a cover opening/closing mechanism 90 according to the present embodiment is designed by linking a slide guide plate 62 of a slide guide portion 6 and a slide cover 48 via a linking member 91. A first guide member 92 is provided on the slide guide plate 62. The first guide member 92 is e.g. shaped substantially in a columnar shape, and integrally formed or by mounting as a separate element. One end portion of the linking member 91 is rotarably and slidably mounted on the first guide member 92. The linking member 91 is shaped in an elongated and flat bar-like shape, and provided with a first guide long hole 93 extending in a longitudinal direction and installing the first guide member 92 to be inserted into the same hole on one end portion. The first guide member 92 is inserted into the first guide long hole 93, and the linking member 91 is rotarably and slidably mounted on the first guide member 92. A ring member 94 and a washer 95 are provided on an outer circumference of the first guide member 92 between the slide guide plate 62 and the linking member 91, and a washer 96 is provided on an outer side (opposite side from the slide guide plate 62) of the linking member 91.

A rotation hole 97 is provided on other end portion of a linking member 91. A second guide member 98 is inserted into the rotation hole 97. The second guide member 98 is shaped substantially in a columnar shape substantially on a central portion in the vicinity of one side end portion on an inner surface of a slider member 3, and the linking member 91 is sandwiched by two washers 99, 100 and rotatably mounted on the second guide member 98 with the second guide member 98 being inserted into the rotation hole 97 of the linking member 91. Further, a second guide long hole 101 extending in a longitudinal direction is provided substantially on a central portion of the linking member 91. A third guide member 102 provided on a surface of a slide cover 48 is inserted into the second guide long hole 101. The third guide member 102 is shaped substantially in a columnar shape substantially on a central portion of the surface of the slide cover 48. An engagement convex portion 104 engaged with the second guide long hole 101 of the linking member 91 is provided coaxially with the third guide member 102, and the linking member 91 is rotatably and slidably engaged with the engagement convex portion 104.

This makes it possible that in a closed state in which a first casing 11 and a second casing 12 overlap each other, a wire guide hole 46 is opened, and when the second casing 12 is slid with regard to the first casing 11 from this state into an opened state, a first guide member 92 accompanied by a movement of a slide guide plate 62 (a slide guide portion 6) rotates and slides with regard to a linking member 91 inside a first guide long hole 93, and the linking member 91 rotates around an axis of a second guide member 98. At this point, since a third guide member 102 rotates and slides inside a second guide long hole 101 of a linking member 91, a slide cover 48 accompanied by the movement of the slide guide plate 62 (the slide guide portion 6) slides into such a direction that the wire guide hole 46 is covered. When the first casing 11 and the second casing 12 are in the opened state, the slide cover 48 stops sliding also and the wire guide hole 46 is covered with the slide cover 48. Further, from the opened state to the closed state a movement opposite to the above-mentioned one is carried out, so that the linking member 91 accompanied by the movement of the slide guide plate 62 (the slide guide portion 6) rotates around an axis of a second guide member 98 in a direction contrary to that as above described, and the slide cover 48 slides into such a direction that the wire guide hole 46 is opened. In the closed state, the slide cover 48 stops sliding also and the wire guide hole 46 is opened by the slide cover 48.

By designing the cover opening/closing mechanism 90 in this manner, a configuration can be simplified and a number of parts and costs can be reduced.

Embodiment 4

Figure 13:
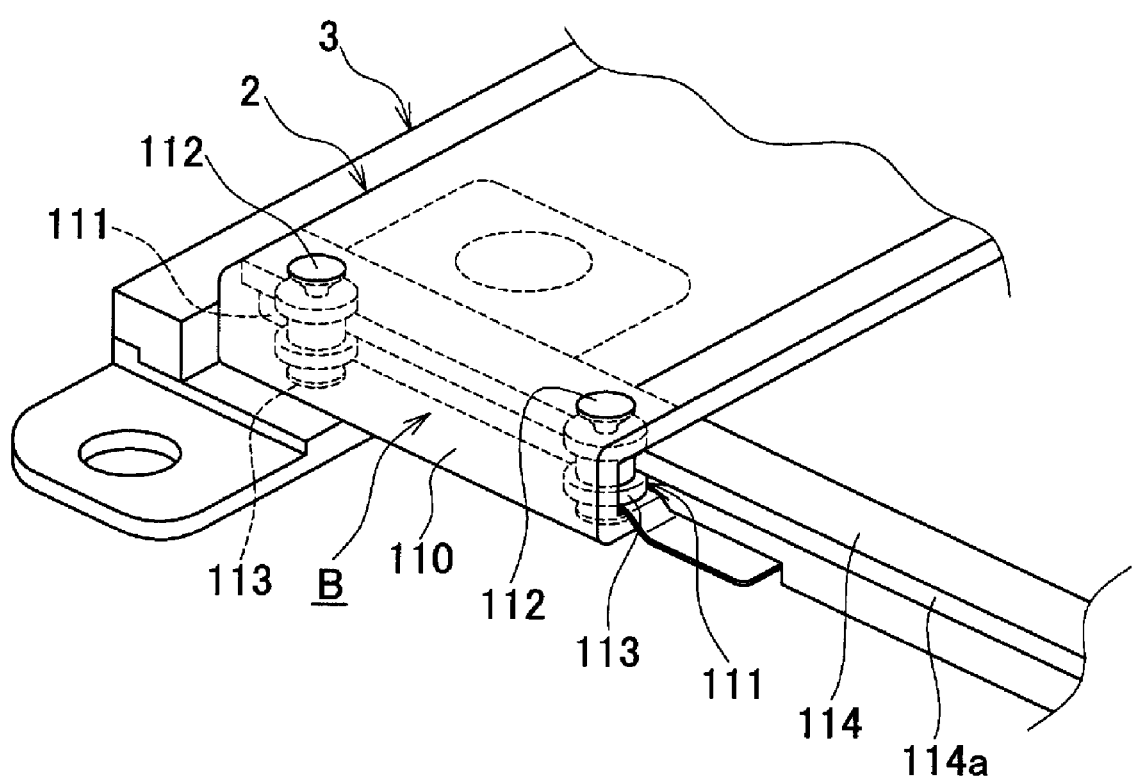
FIG. 13 is a partial perspective view showing another example of a slide engagement portion according to the present invention.
Figure 14:
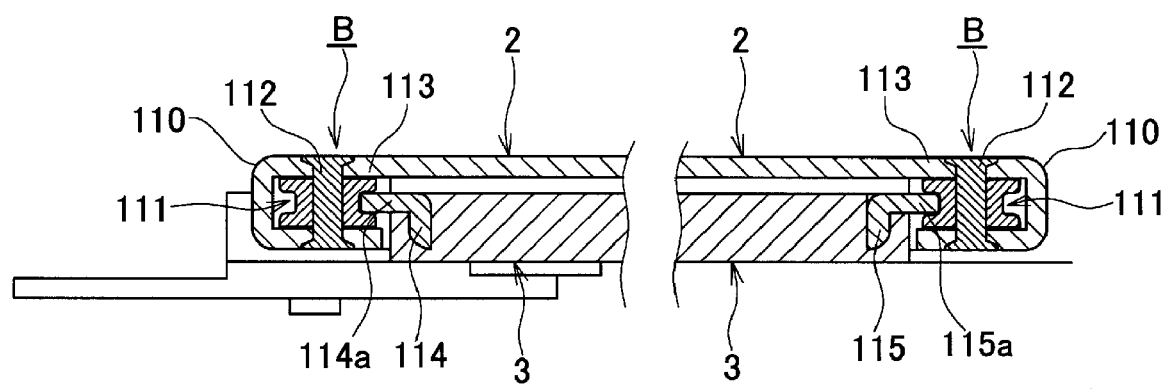
FIG. 14 is a cross section showing an overall structure of a slide engagement portion as shown in FIG. 13.

FIGS. 13 to 14 show still other example of a slide engagement portion. According to the drawings, a slide engagement portion B according to the present embodiment are designed by providing roller portions 111 on engagement portions 110, and the roller portions 111 and a slider member 3 are engaged with each other. The roller portions 111 are e.g. provided in the vicinity of both end portions in a slide direction of the both engagement portions 110 respectively with a U-shaped cross section. In other words, four of the roller portions 111 are provided in total respectively in the vicinity of four corners of the base member 2. Each of the roller portions 111 comprises a shaft 112 mounted to one of the engagement portions 110, by inserting into two wall portions of the engagement portion 110 facing each other, and a roller 113 rotatably mounted around an axis of a portion of the shaft 112 inside the engagement portion 110. Guide rail portions 114a, 115a of guide rail members 114, 115 are engaged with the respective rollers 113.

The application of the invention in this manner can, as shown in FIG. 1B, 2C, or 7C, achieve an operation and effect that the sliding operation is more smoothly conducted by the rollers 113 than that according to the embodiment 1 in obtaining a substantially fully-opened state or a fully-opened state by sliding the second casing 12 with regard to the first casing 11, even if the second casing 12 is inclined due to its own weight with regard to the first casing 11, or otherwise a displacement occurs in a forward/backward direction in the sliding movement of the second casing 12 with regard to the first casing 11. The slide engagement portion B is obviously applicable to any of the above-mentioned embodiments 1 to 3.

Since the present invention is designed as stated in the foregoing, it is optimal for a slide mechanism of a portable equipment used with sliding a first casing 11 and a second casing 12, each having a substantially rectangular shape in plan view, with regard to each other in a short side direction from a state of both casings overlapping each other. As per a portable equipment using the slide mechanism according to the present invention, the invention is optimal in particular for a portable telephone, a PDA, a pocket PC and the like, i.e. those having a substantially rectangular shape in plan view among the portable equipments, since a keyboard portion can be utilized in a large area with a reduced dead space on an upper surface of the first casing 11.

What is claimed is:

1. A slide mechanism equipped with a base member mounted to either one of a first casing and a second casing being components of a portable equipment, a slider member slidably engaged via a slide engagement portion with the base member and mounted to either other one of the first casing and the second casing, urging means provided between the slider member and the base member for slidably urging said base member and said slider member from a predetermined slide position respectively in a closing and/or an opening direction,
wherein said slide engagement portion includes a plurality of guide rail portions provided on said slider member, a guide long hole provided outside a plurality of said guide rail portions on said slider member and extending in a slide direction, engagement portions provided on said base member and respectively engaged with each of said guide rail portions, and a slide guide portion engaged with said guide long hole.

2. The slide mechanism according to claim 1, wherein said urging means are placed inside a bottomed spring receiving concave portion provided on a mounting surface toward said either other one of the first casing and the second casing on said slider member, with one end portion of the urging means being mounted on the slider member, and the other end portion on portions of said slide guide portion extending beyond said guide long hole.

3. The slide mechanism according to claim 1, wherein said slide guide portion is equipped with an escape preventing means for preventing from an escape from said guide long hole.

4. The slide mechanism according to claim 1, wherein said urging means are flat-shaped springs bent on an identical plane.

5. The slide mechanism according to claim 1, wherein on said base member a wire inserting long hole is provided for inserting a wire which electrically connects said either one of the first casing and the second casing mounted on the base member and said either other one of the first casing and the second casing mounted on said slider member, and wherein on said slider member, a wire guide hole is provided for guiding said wire inserted through said wire inserting long hole, as well as a cover for opening and closing the wire guide hole in sliding said base member with regard to the slider member is slidably mounted via a cover opening/closing mechanism.

6. The slide mechanism according to claim 5, wherein said cover opening/closing mechanism has a linking member connecting said cover and said slide guide portion and is so designed that said cover slides accompanied by a movement of said slider member with regard to said base member.

7. The slide mechanism according to claim 1, wherein said slide engagement portion is provided with roller portions on both end portions along a slide direction of engagement portions of said base member, and the roller portions are engaged with said guide rail portions formed with U-formed cross section.

8. A portable equipment equipped with the slide mechanism according to claim 1.

* * * * *